United States Patent [19]

Lee

[11] Patent Number: 4,829,424
[45] Date of Patent: May 9, 1989

[54] MAXIMAL LENGTH IMMEDIATES WITH FIXED SIGN POSITION

[75] Inventor: Ruby B. Lee, Cupertino, Calif.

[73] Assignee: Hewlett-Packard Company, Palo Alto, Calif.

[21] Appl. No.: 750,576

[22] Filed: Jun. 28, 1985

[51] Int. Cl.⁴ .............................................. G06F 9/00
[52] U.S. Cl. .................................................. 364/200
[58] Field of Search ... 364/200 MS File, 900 MS File, 364/748

[56] References Cited

U.S. PATENT DOCUMENTS

| | | | |
|---|---|---|---|
| 4,530,050 | 7/1985 | Fukunaga et al. | 364/200 |
| 4,589,067 | 5/1986 | Porter et al. | 364/748 X |
| 4,595,511 | 6/1986 | Kregness et al. | 364/200 |

Primary Examiner—David L. Clark
Attorney, Agent, or Firm—Alan H. Haggard

[57] ABSTRACT

A computer instruction set is presented in accordance with the preferred embodiment of the present invention. Some instructions within the instruction set have immediate fields which are allowed to vary in length and fill up all unused bit positions in the instructions. A sign bit is in a fixed location for instructions within the instruction set. For example, the sign bit may be right justified with respect to the immediate field, that is the sign bit is put in the least significant (rightmost) bit position. This allows time-critical suboperations to proceed without waiting for the value of the sign bit to be located and decoded.

5 Claims, 3 Drawing Sheets

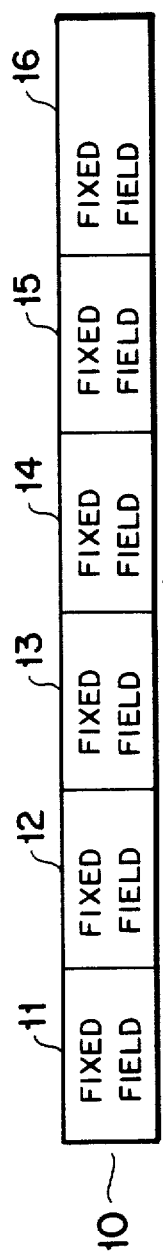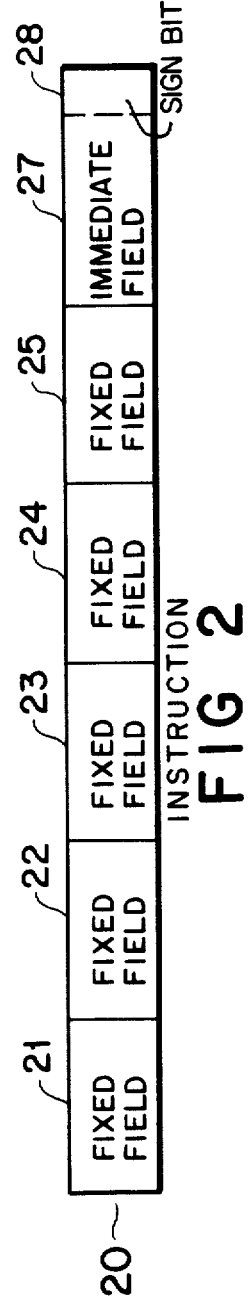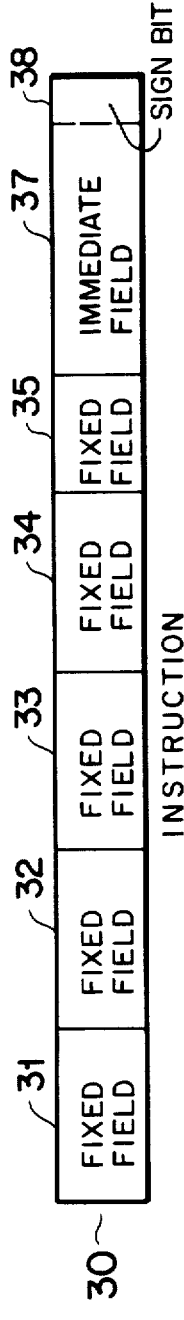

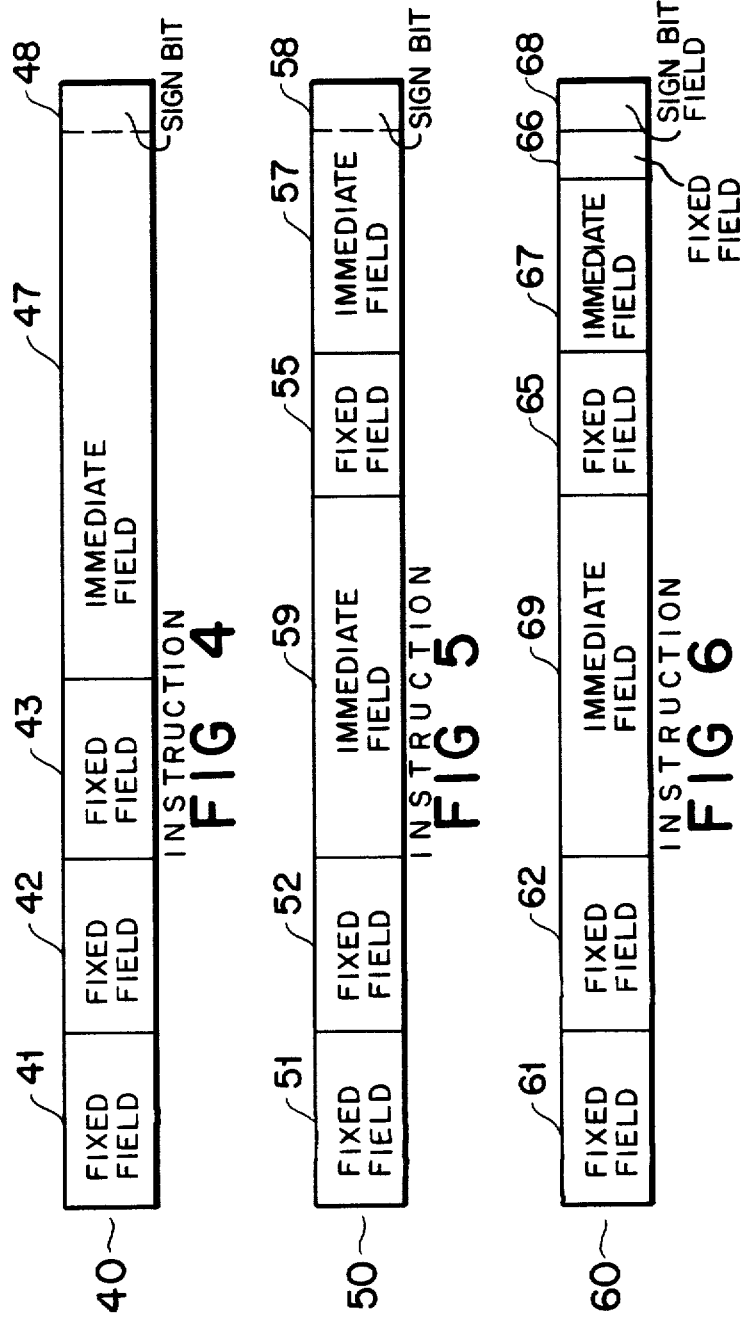

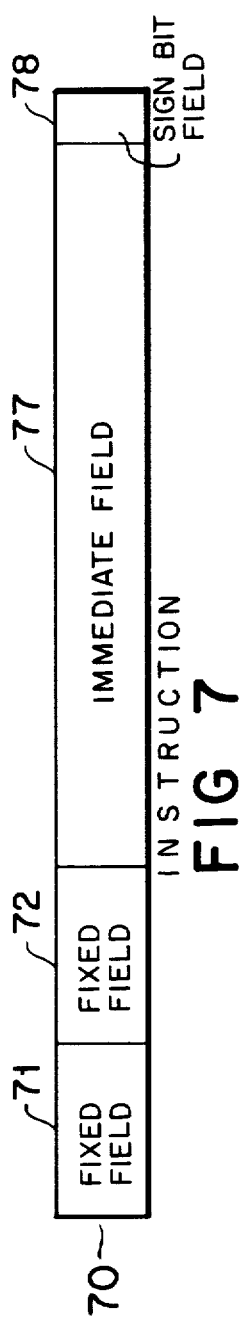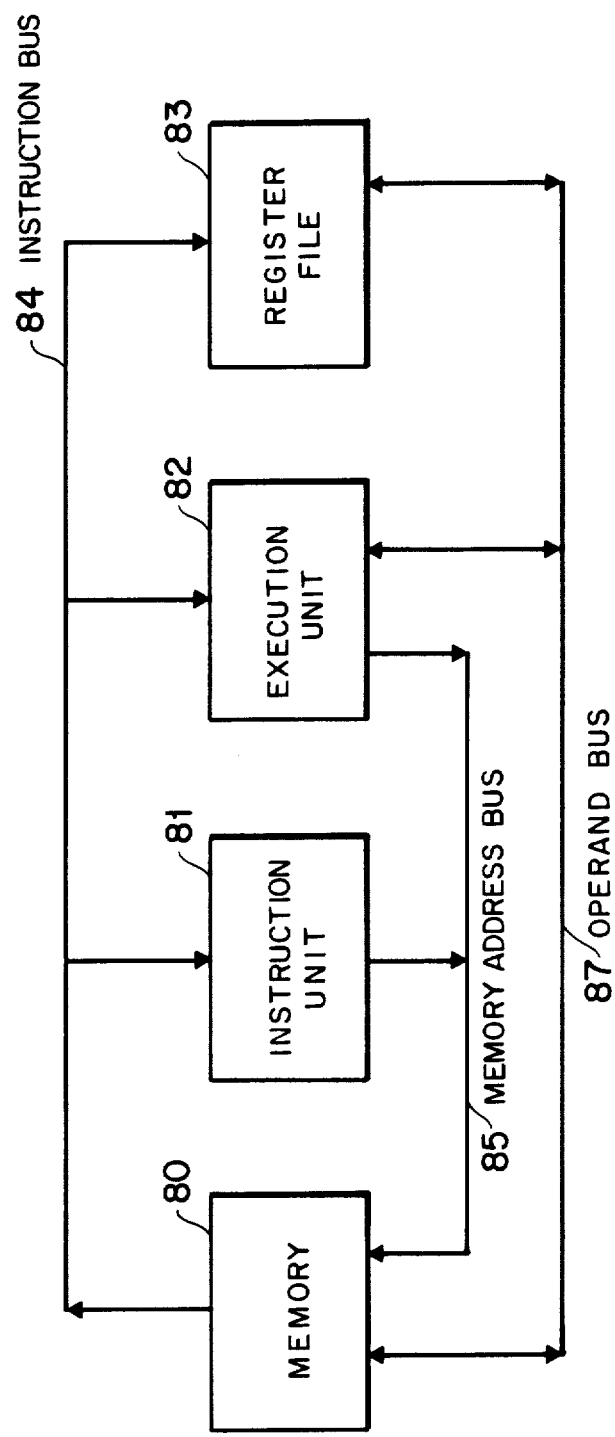

MAXIMAL LENGTH IMMEDIATES WITH FIXED SIGN POSITION

BACKGROUND AND SUMMARY OF THE INVENTION

The present invention relates to the structure of instructions within an instruction set of a computer.

Some computer instructions contain immediates. What is meant by an "immediate" is data embedded in an instruction itself. This data may be used as an operand in an arithmetic operation or as a displacement or offset value for calculating addresses. Immediates are stored in immediate fields which are within instructions. A sign bit within an immediate field is usually the most significant (leftmost) bit of the immediate field. A computer instruction set may have immediate fields of different lengths for different instructions within the instruction set. As a result of the above, the sign bit for immediate fields may vary in location from instruction to instruction. This can unduly increase the complexity of the instruction decoding process and can be especially burdensome if the sign bit contains information to control operations or suboperations specified by the instruction.

When instructions themselves are of variable length, extensive decoding is already required to select each field of an instruction. Complexity required to extract and decode a sign bit may be negligible in relation to the decoding overhead required for each instruction. However, instruction fetching and decoding overhead required often makes variable length instructions unattractive.

When instructions are of fixed length, various means to select a sign bit may be employed. For instance, multiplexors may be used to select a sign bit. However, the use of a multiplexor requires additional hardware and may add additional delay to a critical timing path.

Alternatively, signed immediates may not be permitted to vary in length and must occupy the same bit positions in all instructions in which they occur. Then the customary leftmost position of a sign-bit within an immediate field would place the sign bit in the same position for each instruction. This, however, may unduly restrict the number of immediate values that may be represented.

In accordance with the preferred embodiment of the present invention, in an instruction set immediate fields are allowed to vary in length from instruction to instruction. In particular, an immediate field is allowed to fill up all unused bits in a fixed-length instruction. However, a sign bit within each immediate field is placed in a fixed position within the instruction. For example, the sign bit may be right justified, that is the sign bit is put in the least significant (rightmost) bit position of an immediate field rightmost bit in the where the immediate field is in a fixed location for every instruction in the instruction set which has a signed immediate value. This allows time-critical suboperations to proceed without waiting for the value of the sign bit to be located. At execution time, an immediate value may be reassembled with the sign bit in the leftmost position by appropriate computer hardware and/or software. For instance, the placement of the sign bit can be moved by merely rearranging the order of wires carrying data. The immediate value may then be sign extended to any desired number of bits.

Furthermore, in accordance with the present invention in an instruction an immediate value may be placed in non-contiguous variable portions of an instruction. This is done in order to allow a fixed-length instruction to use a maximal number of bit positions within the instruction to represent immediate values without writing over fixed bit positions in other fixed fields.

BRIEF DESCRIPTIONS OF THE DRAWINGS

FIGS. 1-7 show, for an instruction set, instruction formats with embedded signed immediate fields in accordance with the preferred embodiment of the present invention.

FIG. 8 is a partial block diagram of a computer which executes the instruction set shown in FIGS. 1-7 in accordance with the preferred embodiment of the present invention.

DESCRIPTION OF THE PREFERRED EMBODIMENT

FIGS. 1-7 show seven fixed length instructions within an instruction set. Instructions 10, 20, 30, 40, 50, 60, and 70 within FIGS. 1-7 may instruct a computer to, for instance, load data from a memory location, store data in a memory location, branch conditionally or unconditionally to a ne section of code, place a long immediate value in a register or perform an arithmetic computation. In each of instructions 10, 20, 30, 40, 50, 60, and 70 fixed fields may contain values which function as, for instance, operation codes, register addresses, immediate values, suboperation codes, condition specifiers and status fields.

FIG. 1 shows instruction 10 having six fixed position fields 11, 12, 13, 14, 15, and 16. Instruction 10 has no immediate field.

FIG. 2 shows instruction 20 having five fixed position fields 21, 22, 23, 24 and 25. Instruction 20 also contains a maximal length immediate value contained in an immediate field 27 and a sign-bit field 28. Sign bit field 28 is right justified with respect to immediate field 27.

FIG. 3 shows instruction 30 having five fixed position fields 31, 32, 33, 34 and 35. Instruction 30 also contains a maximal length immediate value contained in an immediate field 37 and a sign-bit field 38. Sign bit field 38 is right justified with respect to immediate field 37. Fixed position field 35 is shorter than fixed position field 25 in instruction 20. Immediate field 37 has expanded to utilize the additional room in instruction 30.

FIG. 4 shows instruction 40 having three fixed position fields 41, 42, and 43. Instruction 40 also contains a maximal length immediate value contained in an immediate field 47 and a sign-bit field 48. Sign-bit field 48 is right justified with respect to immediate field 47. Instruction 40 has no fixed position fields corresponding to fields 34 and 35 of instruction 30. Immediate field 47 has expanded to utilize the additional room in instruction 40, caused by the reduced number of fields.

FIG. 5 shows instruction 50 having three fixed position fields 51, 52, 55. Instruction 50 also contains a maximal length immediate value contained in an immediate field 57, an immediate field 59 and a sign-bit field 58. Sign bit field 58 is right justified with respect to immediate field 57. For maximal utilization of available space within instruction 50, the maximal length immediate value is contained in immediate field 57, in sign bit field 58 and in immediate field 59 even though immediate field 57 and immediate field 59 are noncontiguous.

FIG. 6 shows instruction 60 having four fixed position fields 61, 62, 65, and 66. Instruction 60 also contains a maximal length immediate value contained in an immediate field 67, an immediate field 69 and a sign-bit field 68. Sign bit field 68 is separated from immediate field 67 by fixed position field 66. For maximum utilization of available space within instruction 60, the maximal length immediate value is contained field 69 even though immediate field 67, sign bit field 68 and immediate field 69 are noncontiguous with respect to each other.

FIG. 7 shows instruction 70 having two fixed position fields 71 and 72. Instruction 70 also contains a maximal length immediate value contained in an immediate field 77 and a sign-bit field 78. Sign-bit field 78 is right justified with respect to immediate field 77. Instruction 70 has no fixed position fields corresponding to field 43 of instruction 40. Immediate field 77 has expanded to utilize the additional room in instruction 70, caused by the reduced number of fields.

Instructions 20, 30, 40, 50 60 and 70 shown in FIGS. 2-7 all have the same number of bits. Maximal length immediate values contained in instructions 20, 30, 40, 50, 60 and 70 have a varying bit length, depending upon the number and length of fixed position fields within each instruction. All available bit locations, not utilized by fixed location fields may be utilized to contain maximal length immediate values.

In FIG. 8, a computer is shown to contain an instruction and data memory 80, an instruction unit 81, an execution unit 82 and a register file 83. Typically, when executing an instruction, instruction unit 81 calculates an address of a next instruction to be executed. This address is sent via a memory address bus 85 to instruction and data memory 80. Using the received address, memory 80 locates the next instruction and sends the next instruction to instruction unit 81, execution unit 82 and register file 83 via an instruction bus 84.

If the instruction requires no additional data, or if all data is contained within an immediate field, or within a plurality of immediate fields, execution unit 82 executes the instruction.

If the instruction requires additional data not within an immediate field, either memory 80 or register file 83 must be accessed to obtain the data. If the data is located in memory 80, instruction unit 81 or execution unit 82 generates an address in memory 80 where the additional data may be found. The address is sent to memory 80 via memory address bus 85. Using the received address, memory 80 locates the data and sends the data to execution unit 82 via operand bus 87.

If the data is located in register file 83, an address in register file 83 where the additional data may be found is usually embedded in an instruction on instruction bus 84. The address is sent to register file 83 via register address bus 86. Using the received address, register file 83 locates the data and sends the data to execution unit 82 via operand bus 87. As the addressable data stored in register file 83 is typically many magnitudes less than the addressable data stored in memory 80, retrieval of data from register file 83 is much faster than retrieval of data from memory 80. Furthermore, when no data needs to be retrieved, but all is resident within the instruction itself, execution time of the instruction is minimized. Therefore it is advantageous to provide for maximal length immediate values.

Even in cases where retrieval of data from register file 83 takes no more time than extracting an immediate value embedded in the instruction itself, it is still advantageous to provide for maximal length immediate values since this minimizes the usage of the storage in register file 83, which is usually a scarce resource. The optimization of the register usage in register file 83 need not then include allocation for constant values, which may be contained in maximal length immediate values imbedded in the instruction itself.

I claim:

1. A computer which executes a computer instruction set, the computer instruction set comprising:
a first instruction containing a first immediate value within a first immediate field and within a second immediate field, the second immediate field located immediately to the right of the first immediate field and the second immediate field containing a sign bit for the first immediate value; and,
a second instruction having a second immediate value at least partially within a third immediate field and within a fourth immediate field, the fourth immediate field located immediately to the right of the third immediate field and the fourth immediate field containing a sign bit for the second immediate value wherein the first instruction and the second instruction have the same number of bits, wherein the first immediate field and the third immediate field have a different number of bits, and wherein the second immediate field is in the same location within the first instruction as the fourth immediate field is within the second instruction.

2. A computer instruction set as in claim 1 wherein the second instruction includes a fifth immediate field not contiguous with the third immediate field and wherein the second immediate value is partially within the fifth immediate field.

3. A computer which executes a computer instruction set, the instruction including a computer instruction comprising:
a first immediate field;
a second immediate field non-contiguous to the first immediate field wherein both the first immediate field and the second immediate field each contain part of an immediate value.

4. A computer as in claim 3 wherein the second immediate field contains only a sign bit.

5. A computer which executes a computer instruction set, the computer instruction set comprising:
a first instruction containing a first immediate value within a first immediate field, the first immediate field having a first bit position reserved for a sign bit; and,
a second instruction having a second immediate value at least partially within a second immediate field and at least partially within a third immediate field, the second immediate field having a second bit position reserved for a sign bit, wherein the first instruction and the second instruction have the same number of bits, wherein the first immediate field and the second immediate field have a different number of bits, wherein the first bit position is in the same location within the first instruction as the second bit position is within the second instruction and wherein the second immediate field is not contiguous with the third immediate field.

* * * * *